United States Patent
Comerford et al.

(10) Patent No.: US 9,311,917 B2
(45) Date of Patent: Apr. 12, 2016

(54) MACHINE, SYSTEM AND METHOD FOR USER-GUIDED TEACHING OF DEICTIC REFERENCES AND REFERENT OBJECTS OF DEICTIC REFERENCES TO A CONVERSATIONAL COMMAND AND CONTROL SYSTEM

(75) Inventors: Liam D. Comerford, Carmel, NY (US); Mahesh Viswanathan, Yorktown Heights, NY (US)

(73) Assignee: International Business Machines Corporation, Armonk, NY (US)

(*) Notice: Subject to any disclaimer, the term of this patent is extended or adjusted under 35 U.S.C. 154(b) by 1016 days.

(21) Appl. No.: 12/357,353

(22) Filed: Jan. 21, 2009

(65) Prior Publication Data

US 2010/0184011 A1   Jul. 22, 2010

(51) Int. Cl.
*G06F 17/00* (2006.01)
*G06F 17/20* (2006.01)
*G10L 15/26* (2006.01)
*G06N 99/00* (2010.01)

(52) U.S. Cl.
CPC .............. *G10L 15/26* (2013.01); *G06N 99/005* (2013.01)

(58) Field of Classification Search
None
See application file for complete search history.

(56) References Cited

U.S. PATENT DOCUMENTS

| | | | |
|---|---|---|---|
| 6,115,482 A * | 9/2000 | Sears et al. | 382/114 |
| 6,907,581 B2 * | 6/2005 | Noy et al. | 715/863 |
| 6,961,644 B2 | 11/2005 | Mercier et al. | |
| 7,036,094 B1 * | 4/2006 | Cohen et al. | 715/863 |
| 7,295,904 B2 * | 11/2007 | Kanevsky et al. | 701/36 |
| 7,295,975 B1 * | 11/2007 | Bangalore et al. | 704/231 |
| 7,317,789 B2 | 1/2008 | Comerford | |
| 7,321,854 B2 * | 1/2008 | Sharma et al. | 704/243 |
| 7,552,403 B2 * | 6/2009 | Wilson | 715/863 |
| 7,809,567 B2 * | 10/2010 | Ju et al. | 704/257 |
| 2007/0248218 A1 | 10/2007 | Comerford | |
| 2007/0294122 A1 * | 12/2007 | Johnston | 705/10 |

OTHER PUBLICATIONS

Sharma, R.; Zeller, M.; Pavlovic, V.I.; Huang, T.S.; Lo, Z.; Chu, S.; Zhao, Y.; Phillips, J.C.; Schulten, K.; , "Speech/gesture interface to a visual-computing environment," Computer Graphics and Applications, IEEE , vol. 20, No. 2, pp. 29-37, Mar./Apr. 2000.*

(Continued)

*Primary Examiner* — Kakali Chaki
*Assistant Examiner* — Daniel Pellett
(74) *Attorney, Agent, or Firm* — Schmeiser, Olsen & Watts, LLP; Matthew Chung

(57) ABSTRACT

A machine, system and method for user-guided teaching of deictic references and referent objects of deictic references to a conversational system. The machine includes a system bus for communicating data and control signals received from the conversational system to the computer system, a data and control bus for connecting devices and sensors in the machine, a bridge module for connecting the data and control bus to the system bus, respective machine subsystems coupled to the data and control bus, the respective machine subsystems having a respective user interface for receiving a deictic reference from a user, a memory coupled to the system bus for storing deictic references and objects of the deictic references learned by the conversational system and a central processing unit coupled to the system bus for executing the deictic references with respect to the objects of the deictic references learned.

20 Claims, 9 Drawing Sheets

(56) References Cited

OTHER PUBLICATIONS

Sharma, R.; Zeller, M.; Pavlovic, V.I.; Huang, T.S.; Lo, Z.; Chu, S.; Zhao, Y.; Phillips, J.C.; Schulten, K.; , "Speech/gesture interface to a visual-computing environment," Computer Graphics and Applications, IEEE , vol. 20, No. 2, pp. 29-37, Mar/Apr 2000.*

Andrew G. Brooks and Cynthia Breazeal. 2006. Working with robots and objects: revisiting deictic reference for achieving spatial common ground. In Proceedings of the 1st ACM SIGCHI/SIGART conference on Human-robot interaction (HRI '06). ACM, New York, NY, USA, 297-304.*

Rogalla, O.; Ehrenmann, M.; Zollner, R.; Becher, R.; Dillmann, R.; , "Using gesture and speech control for commanding a robot assistant," Robot and Human Interactive Communication, 2002. Proceedings. 11th IEEE International Workshop on , vol., No., pp. 454-459, 2002.*

Haasch, A.; Hofemann, N.; Fritsch, J.; Sagerer, G.; , "A multi-modal object attention system for a mobile robot," Intelligent Robots and Systems, 2005. (IROS 2005). 2005 IEEE/RSJ International Conference on , vol., No., pp. 2712-2717, Aug. 2-6, 2005.*

Cavedon, et al., "Developing a Conversational In-Car Dialog System", 11 pp, 2007, USA.

http://www.mercuryvehicles.com/extras/sync.asp, 2008.

http://www.nuance.com/news/pressreleases/2006/20060330_automotive.asp, 2006.

Comerford, L., et al., U.S. Appl. No. 12/357,342, Machine, System and Method for User-Guided Teaching and Modifying of Voice Commands and Actions Executed by a Conversational Learning System, filed on Jan. 21, 2009.

* cited by examiner

```
                                                               ┌─ 900
    ┌─────────────────────────────────────────────────────────┴──┐
    │   AN EXAMPLE OF A TRAINING DIALOG WITH "TOBOR" FOLLOW:      │
902─┼──USER: "TOBOR, LEARN A NEW OBJECT."                         │
904─┼──TOBOR: "I'M READY TO LEARN A NEW OBJECT."                  │
906─┼──USER: [POINTING IN THE DIRECTION OF AN APPLE ON A NEARBY TABLE] "THAT IS
    │      AN APPLE."                                             │
908─┼──TOBOR: "LET ME SEE IF I'VE GOT THIS STRAIGHT, [TOBOR USES IMAGE
    │      RECOGNITION SOFTWARE TO ANALYZE THE POINTING GESTURE IN ORDER TO
    │      DETERMINE THE REGION INDICATED BY THE POINTING ACT. FINDING A TABLE IN
    │      THE REGION, AND NOT HAVING A "TABLE" REFERENCE IN ITS VOCABULARY,
    │      TOBOR USES A LASER SCANNER TO ILLUMINATE THE TABLETOP BEGINNING A
    │      CONFIRMING DEICTIC REFERENCE] THAT IS AN APPLE."
910─┼──USER: "NO"
912─┼──TOBOR: "HOW ABOUT THIS? [TOBOR ILLUMINATES A TABLE LEG]
914─┼──USER: "COLDER"
916─┼──TOBOR: "[ILLUMINATING THE BOWL OF FRUIT ON THE TABLE] HOW ABOUT THIS?"
918─┼──USER: "WARMER"
920─┼──TOBOR: "[ILLUMINATING AN APPLE VISIBLE OVER THE TOP OF THE BOWL] IS THIS
    │      IT?"
922─┼──USER: "YES"
924─┼──TOBOR: [MAY MOVE TO THE TABLE AND PICK UP THE APPLE TO DEVELOP A
    │      LARGER DATA BASE OF APPLE IMAGES AND A MEASURE OF THE WEIGHT AND
    │      SURFACE FRICTION AN APPLE PRESENTS.]
926─┼──TOBOR: [USING NETWORK CONNECTION AND / OR A STORED IMAGE DATABASE
    │      COLLECTS IMAGES OF APPLES IN ORDER TO OBTAIN MORE TRAINING DATA AND
    │      THE SPELLING OF THE WORD "APPLE". FOLLOWING IMAGE PROCESSING AND
    │      STORAGE OF THE NEW VOCABULARY WORD.]
928─┼──[TOBOR COMPLETES THE DIALOG] "I THINK I UNDERSTAND THE WORD 'APPLE'."
    └────────────────────────────────────────────────────────────┘
```

FIG. 9

```
                                                              ┌─ 1000
ON A SUBSEQUENT OCCASION, THE USER HAS A COMMAND AND CONTROL DIALOG
WITH TOBOR USING DEICTIC REFERENCE. [ASSUME HERE THAT TOBOR'S
COMMAND VOCABULARY INCLUDES THE PHRASE "BRING X TO ME" WHERE "X" IS
AN OBJECT IN TOBOR'S VOCABULARY.]
```

1002 — USER: "OPEN THE REFRIGERATOR."

1004 — TOBOR: "OK [LOCATES AND OPENS THE REFRIGERATOR']"

1006 — USER: "[POINTING AT THE INTERIOR OF THE REFRIGERATOR] BRING ME THAT APPLE."

1008 — TOBOR: "[USING IMAGE PROCESSING TO DISTINGUISH AN APPLE IN THE REFERENCED REGION, PICKS UP THE APPLE AND EXECUTES THE 'BRING X TO ME' COMMAND.] HERE YOU ARE.

1010 — USER: "THANKS"

FIG. 10

```
                                                              ┌─ 1100
ON A SUBSEQUENT OCCASION, THE USER HAS A COMMAND AND CONTROL DIALOG
WITH TOBOR IN WHICH TOBOR IS INCORRECT IN ITS UNDERSTANDING OF A
DEICTIC REFERENCE. HERE THE USER HAS ARRIVED IN THE PRODUCE
DEPARTMENT OF A SUPERMARKET WITH TOBOR:
```

1102 — USER: "[POINTING TO A PRODUCE STAND WITH APPLES, ORANGES AND GRAPES] BRING ME THREE OF THOSE APPLES."

1104 — TOBOR: [APPLYING ITS RECOGNITION SOFTWARE IS UNABLE TO DISTINGUISH THE RED APPLES FROM THE ORANGES, SO BRINGS THE THREE ORANGES]

1106 — USER: "WRONG"

FIG. 11

MACHINE, SYSTEM AND METHOD FOR USER-GUIDED TEACHING OF DEICTIC REFERENCES AND REFERENT OBJECTS OF DEICTIC REFERENCES TO A CONVERSATIONAL COMMAND AND CONTROL SYSTEM

FIELD OF THE INVENTION

The present invention relates to machines and more specifically to a user-guided technique for teaching deictic references and objects of deictic references to a conversational command and control system installed in a vehicle or a machine for automating the execution of deictic references for performing action and/or tasks with respect to the referent objects that have been added to the conversational command and control system by the conversational system of the vehicle or machine.

BACKGROUND OF THE INVENTION

It is widely held that the physical act of pointing, particularly with the index finger, is a uniquely human action and one of the foundation elements of human language. Computing systems provide the means by which expertise can be built into tools, such as, vehicles and unspecialized tools, such as robots. Efforts to build computing systems that support human modes of communication, such as, spoken dialog have not addressed this human communication modality since the domain of human computer interaction has not required this modality. As such, there is a need to provide a computing system that supports such human modes of communication.

SUMMARY OF THE INVENTION

The present invention resides in a machine, system and method for user-guided teaching of a deictic reference and an object of a deictic reference to a conversational command and control system installed in a vehicle or machine, in accordance with an embodiment of the invention. In an embodiment, the deictic reference tool further includes a verification module for confirming understanding of the one or more objects of the deictic reference learned from the user in order to detect and correct any errors pertaining to the one or more objects of the deictic reference learned, wherein the confirming understanding of the one or more objects of the deictic reference learned includes one or more of: displaying the object of the deictic reference utilizing a graphical user interface for permitting correction by spoken or graphical or deictic interactions, utilizing a laser scanner subsystem to outline or paint the object of the deictic reference and utilizing a computer-driven manipulator to point the object of the deictic reference. In an embodiment, the deictic reference module observes the physical pointing gesture via one or more image capturing devices coupled to the computer system and decodes the one or more objects of the deictic reference utilizing the conversational system. The deictic reference tool further includes a decoder module for decoding the physical pointing gesture to locate a reference region and an object recognition module for determining whether or not a object is a correct object that the physical pointing gesture points to. In an embodiment, the conversational system further includes a speech recognition module for decoding any spoken utterances received from a user using a respective spoken user interface of the one or more respective machine subsystems coupled to the data and control bus, a gesture recognition module for decoding indications received via a respective physical user interface of the one or more respective machine subsystems coupled to the data and control bus and a haptic module for processing haptic interactions received via a respective physical user interface of the one or more respective machine subsystems coupled to the data and control bus.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 9 depicts an embodiment of a teaching or learning dialog between a human operator or user and a conversational system in a machine that contains a deictic reference tool or program for user-guided teaching of a referent object of a deictic reference received from a user, in accordance with an embodiment of the present invention.

FIG. 10 depicts an embodiment of an execution dialog between a human operator or user and a conversational command and control system in a machine that contains a deictic reference tool or program for execution of a deictic reference learned by the conversational system for performing or executing a sequence of actions and/or tasks on a referent object of the deictic reference, in accordance with an embodiment of the present invention.

FIG. 11 depicts an embodiment of an execution dialog between a human operator or user and a conversational command and control system in a machine that contains a deictic reference tool or program for execution of a deictic reference learned by the conversational system for performing or executing a sequence of actions and/or tasks on a referent object of the deictic reference and for correcting the referent object learned, in accordance with an embodiment of the present invention.

DETAILED DESCRIPTION OF THE INVENTION

Figure 1:
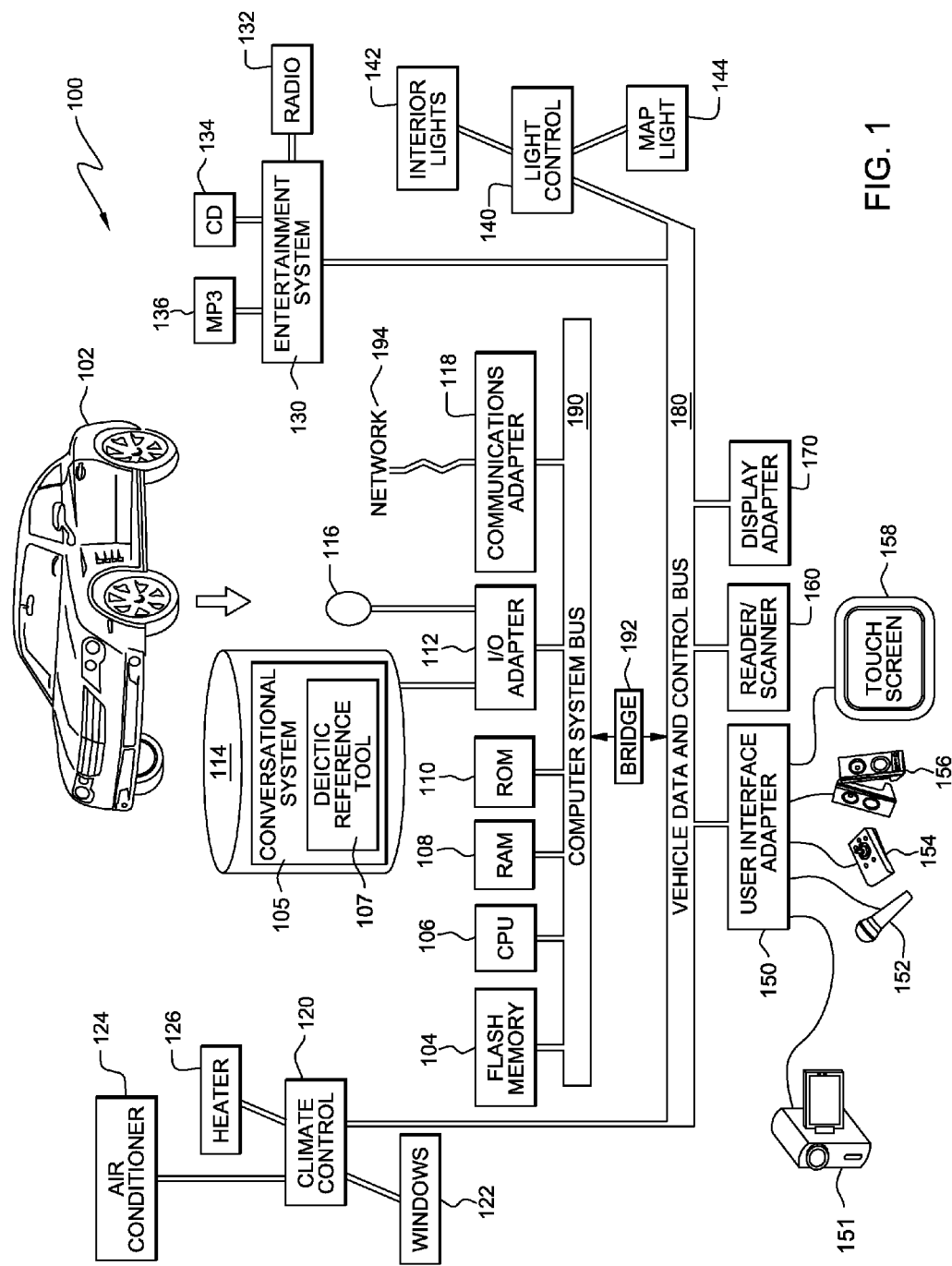
FIG. 1 is a schematic block diagram illustrating one embodiment of a computer infrastructure of a machine, in particular, a vehicle coupled to a computer system having installed thereon a conversational command and control system that includes a deictic reference tool or program for user-guided teaching of deictic references and referent objects of deictic references to the command and control system for performing actions and/or tasks with respect to the referent objects known to or learned by the conversational system, in accordance with an embodiment of the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module or component of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Further, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, over disparate memory devices, and may exist, at least partially, merely as electronic signals on a system or network.

Furthermore, modules may also be implemented as a combination of software and one or more hardware devices. For instance, a module may be embodied in the combination of a software executable code stored on a memory device. In a further example, a module may be the combination of a processor that operates on a set of operational data. Still further, a module may be implemented in the combination of an electronic signal communicated via transmission circuitry.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

In one embodiment, the invention provides a vehicle or machine or a home automation computer system that has deployed thereon a conversational command and control system having a deictic reference tool or program for user-guided teaching of deictic references and referent objects of deictic references to the conversational system for performing actions and/or tasks with respect to the referent objects known to or learned by the conversational system, in accordance with an embodiment of the present invention. Reference is now made to FIG. 1, reference numeral 100, which schematically illustrates an embodiment of a machine, namely, a vehicle 102 having a computing system that includes a conversational system 105 (also referred to as a "conversational command and control system" or "spoken language command and control system" or simply as "command and control system") having a deictic reference tool or program 107 for user-guided teaching of deictic references and referent objects of deictic references to the conversational system for performing actions and/or tasks with respect to the referent objects that have been added to the command and control system by the conversational system, in accordance with an embodiment of the present invention. It will be obvious to one of ordinary skill in the art that a system for user-guided teaching of deictic references may be combined with a conversational system that provides a spoken language command and control system, regardless of whether or not the spoken language command and control system includes user-guided teaching of command vocabulary and action sequences. The deictic reference tool provides the means by which the referent objects to be acted upon may be specified, while the spoken language command and control system provides the means by which the actions and/or tasks to be carried out on a referent object may be specified. In an embodiment, as shown in FIG. 1, the vehicle or car is a land vehicle having wheels. In one embodiment, the conversational system 105 is a spoken language command and control system that uses a commercially available speech recognition program or software, such as, the IBM® Embedded Speech Recognition software that is commercially available from International Business Machines Corporation. In an embodiment, the conversational system 105 includes a deictic reference tool or program 107 for user-guided teaching of deictic references and referent objects of deictic references to the conversational system for performing actions and/or tasks with respect to the referent objects known to or learned by the conversational system. The conversational system 105, which includes the deictic reference tool 107, comprises a logic unit that contains a plurality of modules configured to functionally execute the necessary steps of teaching deictic references and referent objects of deictic references to the conversational system for performing actions and/or tasks with respect to the referent objects known to or learned by the conversational system 105, as discussed further herein below with respect to FIG. 2. Further, as shown in FIG. 1, the vehicle computing system 100 having the conversational system 105 includes a vehicle data and control bus 180. In an embodiment, the vehicle data and control bus comprises a Controller Area Network (CAN) bus. However, the vehicle data and control bus may alternatively comprise any of the following: MOST (Media Oriented Systems Transport), SAE J1850 interface, MI (Motorola Interconnect) bus, DSI (Distributed Systems Interface) bus, BST (Bosch-Siemens-Temic) bus and Boeing Intellibus. In an embodiment, the vehicle data and control bus 180 is configured to interface with one or more devices or components within the vehicle 102, such as, the climate control system 120, the entertainment system 130 and/or the light control system 140 within the vehicle 102. Further, the vehicle data and control bus 180 is coupled to a user interface adapter 150, a reader or scanner device 160 and a display adapter 170, as explained further herein below. In particular, a user may operate or control the various devices or components within the vehicle 102 by interfacing with one or more devices coupled to the user interface adapter 150 coupled to the vehicle data and control bus 180. Further, in an embodiment as shown in FIG. 1, the computing system 100 includes a computer system bus 190 that is coupled to the various components of the computing system 100 in the vehicle 102 and is further coupled to the vehicle data and control bus 180 via an intermediate bridge module 192, which in an embodiment supports two way communication with buffering, signal level and code translation support. In an embodiment, the system bus 190 connects a central processing unit (CPU) 106, a flash memory 104, a main memory comprised of RAM (Random Access Memory) 108, ROM (Read-Only Memory) 110, an input/output (I/O) adapter 112 and a communications adapter 118, which can interconnect computer bus 190 with an external network 194 through a suitable connection. The communications adapter 118 is configured, in one embodiment, to facilitate network communications of the system 100 over a communications channel of a network 194 that the conversational system is connected to, such that, the system 100 can communicate with other systems. Further, in an embodiment, the input/output (I/O) adapter 112 communicates with devices, such as, the hard disk 114 and/or a computer readable storage medium or media 116, such as, a magnetic tape or disk, optical media, DVD, memory stick, semiconductor memory, etc., which contains machine readable instructions that can be loaded into the hard disk 114 containing the conversational system 105 with a deictic reference tool 107 for teaching deictic references and referent objects of deictic references to the conversational system for performing actions and/or tasks with respect to the referent objects known to or learned by the conversational system 105.

Further, in an embodiment, the vehicle computer system 100 can download machine readable instructions stored on a server coupled to the vehicle computer system 100 via the network 194. Furthermore, the communications adapter 118 is configured to permit communication between the various components or modules of the vehicle conversational system 100. Turning to the vehicle data and control bus 180, in an embodiment, the vehicle data and control bus 180 within system 100 is coupled to the climate control system 120, the entertainment system 130, the light control system 140, the user interface adapter 150, a reader or scanner 160 and a display adapter 170. In an embodiment, the user interface adapter 150 is coupled to one or more devices, such as, a video camera 151, a microphone 152, a joystick 154, an audio amplifier 156 and a touch screen 158. The user interface 150, in one embodiment, is configured to enable a user or car operator to interact with the computer system 100 for teaching deictic references and referent objects of deictic references to the conversational system for performing actions and/or tasks with respect to the referent objects known to or learned by the conversational system, for instance, using the video camera 151 to observe the referent objects of the deictic references being taught to the conversational system using the deictic reference tool or program 107. In an embodiment, the climate control system 120 that is coupled to the vehicle data and control bus 180 controls devices, such as, the air conditioner 124, the heater 126, and the windows 122. Further, in an embodiment, the entertainment system 130 that is coupled to the car bus 190 controls audio devices, such as, the MP3 (Moving Picture Experts Group (MPEG) Audio Layer 3) player 136, the CD (Compact Disc) player 134 and the radio 132. In addition, the light control system 140 that is coupled to the vehicle data and control bus 180 controls devices, such as, the interior lights 142 and the map light 144. In particular, a user may use devices, such as, the video camera 151, the speakerphone 152 or the touch screen 158 in conjunction with the conversational system 105 having the deictic reference tool 107 for teaching deictic references and referent objects of deictic references to the conversational system for performing actions and/or tasks with respect to the referent objects known to or learned by the conversational system. For instance, a user may teach the conversational system 105 a deictic reference by physically pointing to a referent object, which is detected by the video camera 151, and by the spoken words, commands or utterances received by the spoken interface of the spoken language command and control system in the conversational system 105. The conversational system learns the deictic reference by decoding the spoken voice command using the spoken language command and control system and learns the deictic reference by associating the deictic reference with a referent object of the deictic reference, as discussed further herein below with respect to FIGS. 9-11. It will be obvious to one of ordinary skill in the art that the forgoing description contains more functional elements and modules than are needed for a minimal implementation of this invention and that complement of functional elements may be reduced or enlarged as needed in specific applications without departure from the teaching of this invention.

Figure 2:
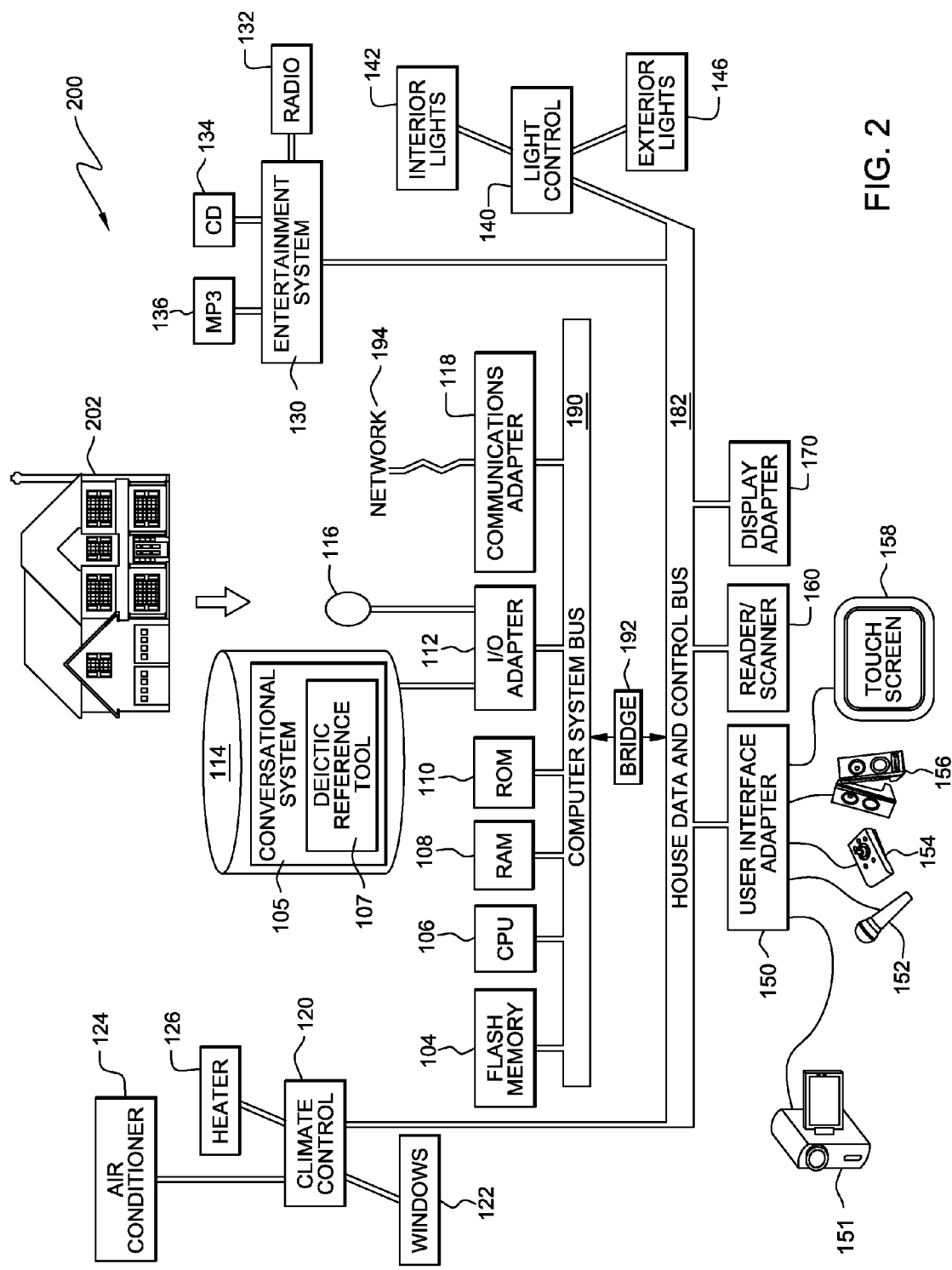
FIG. 2 is a schematic block diagram illustrating one embodiment of a computer infrastructure in a house or office that includes a conversational command and control system having a deictic reference tool or program for user-guided teaching of deictic references and referent objects of deictic references to the conversational system for performing actions and/or tasks with respect to the referent objects known to or learned by the conversational system, in accordance with an embodiment of the present invention.

Further, reference is now made to FIG. 2, reference numeral 200, which schematically illustrates an embodiment of a machine utilized in home or office automation that includes a computing system having a conversational system 105 that includes a deictic reference tool or program 107 for user-guided teaching of deictic references and referent objects of deictic references to the conversational system for performing actions and/or tasks with respect to the referent objects within the house or office, in accordance with an embodiment of the present invention. The computer system 200 is similar to that described herein in FIG. 1, except that instead of a vehicle data and control bus 180 in FIG. 1, the home computer system 200 includes at least one home or office data and control bus 182 that is configured to interface with one or more devices or components within the home 202, such as, the climate control system 120, the entertainment system 130 and/or the light control system 140 within the vehicle 102. It will be obvious to one skilled in the art that multiple bus types may be employed by the home computer system 200 for interfacing with additional devices and/or components and/or subsystems within the home 202. Further, the home data and control bus 182 is coupled to a user interface adapter 150, a reader or scanner device 160 and a display adapter 170, as explained further herein below. In particular, a user may operate or control the various devices or components within the home 202 by interfacing with one or more devices coupled to the user interface adapter 150 coupled to the home or office data and control bus 182. Further, in an embodiment as shown in FIG. 1, the computing system 200 includes a computer system bus 190 that is coupled to the various components of the computing system 200 in the home or office 102 and is further coupled to the home or office data and control bus 182 via an intermediate bridge module 192, which in an embodiment supports two way communication with buffering, signal level and code translation support. In an embodiment, the home or office data and control bus 182 within system 200 is coupled to the climate control system 120, the entertainment system 130, the light control system 140, the user interface adapter 150, a reader or scanner 160 and a display adapter 170. In an embodiment, the user interface adapter 150 is coupled to one or more devices, such as, a video camera 151, a microphone 152, a joystick 154, an audio amplifier 156 and a touch screen 158. The user interface 150, in one embodiment, is configured to enable a home owner or an office employer to interact with the computer system 200 for teaching deictic references and referent objects of deictic references to the conversational system for performing actions and/or tasks with respect to referent objects known to or learned by the conversational system, for instance, using the video camera 151 to observe the referent objects of the deictic references being taught to the conversational system using the deictic reference tool or program 107. In an embodiment, the climate control system 120 that is coupled to the home or office data and control bus 182 controls devices, such as, the air conditioner 124, the heater 126, and the windows 122. Further, in an embodiment, the entertainment system 130 that is coupled to the data and control bus 182 controls home or office audio devices, such as, the MP3 (Moving Picture Experts Group (MPEG) Audio Layer 3) player 136, the CD (Compact Disc) player 134 and the radio 132. In addition, the light control system 140 that is coupled to the data and control bus 182 controls devices, such as, the interior lights 142 and exterior lights 146. In particular, a user may use devices, such as, the video camera 151, the speakerphone 152 or the touch screen 158 in conjunction with the conversational system 105 having the deictic reference tool 107 for teaching deictic references and referent objects of deictic references to the conversational system for performing actions and/or tasks with respect to the referent objects known to or learned by the conversational system. For instance, a home owner may teach the conversational system 105 a deictic reference by physically pointing to a referent object, which is detected by the video camera 151, and by the spoken words, commands or utterances received by the spoken interface of the spoken language command and control system in the conversational system 105. Since the remainder of the devices connected to the computer system bus 190 in FIG. 2 are the same as that described in FIG. 1, these devices will not be described herein with respect to FIG. 2. It will be obvious to one of ordinary skill in the art that the forgoing description contains more functional elements and modules than are needed for a minimal implementation of this invention and that complement of functional elements may be reduced or enlarged as needed in specific applications without departure from the teaching of this invention.

Figure 3:
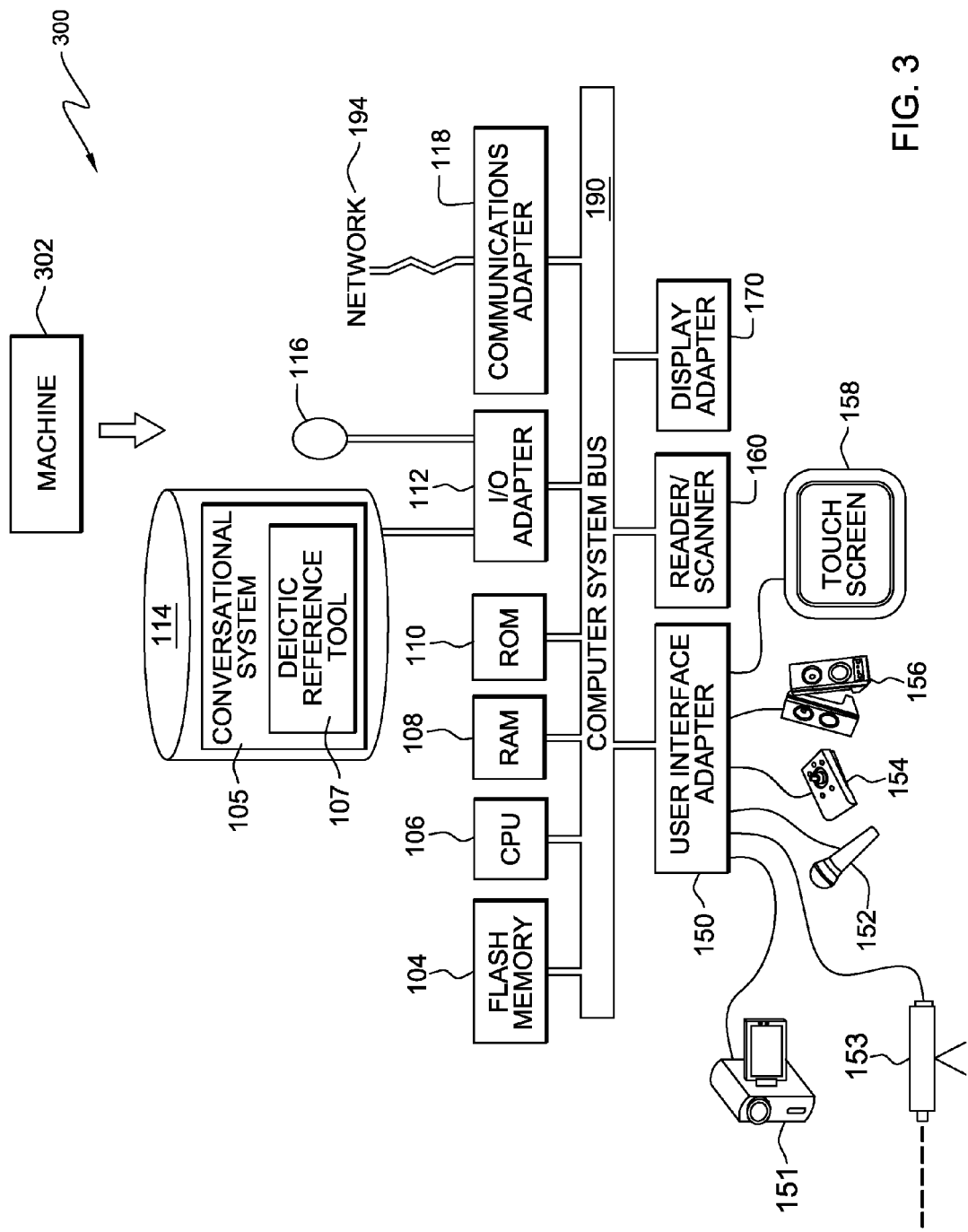
FIG. 3 is a schematic block diagram illustrating one embodiment of a computer infrastructure in a machine, such as, a tool or a robot, that includes a conversational command and control system having a deictic reference tool or program for user-guided teaching of deictic references and referent objects of deictic references to the conversational system for performing actions and/or tasks with respect to the referent objects known to or learned by the conversational system, in accordance with an embodiment of the present invention.

Turning to FIG. 3, FIG. 3, reference numeral 300, which schematically illustrates an embodiment of a tool or machine 302, such as, a robot that includes a computing system having a conversational system 105 that includes a deictic reference tool or program 107 for teaching deictic references and referent objects of deictic references to the conversational system for performing actions with respect to the referent objects known to or learned by the conversational system 105. The computer system 300 includes a computer system bus 190 that is coupled to a user interface adapter 150, a reader or scanner device 160, and a display adapter 170, as explained further herein below. In an embodiment, the system bus 190 connects a central processing unit (CPU) 106, a flash memory 104, a main memory comprised of RAM (Random Access Memory) 108, ROM (Read-Only Memory) 110, an input/output (I/O) adapter 112 and a communications adapter 118, which can interconnect computer bus 190 with an external network 194 through a suitable connection. The communications adapter 118 is configured, in one embodiment, to facilitate network communications of the system 100 over a communications channel of a network 194 that the conversational system is connected to, such that, the system 100 can communicate with other systems. Further, in an embodiment, the input/output (I/O) adapter 112 communicates with devices, such as, the hard disk 114 and/or a computer readable storage medium or media 116, such as, a magnetic tape or disk, optical media, DVD, memory stick, semiconductor memory, etc., which contains machine readable instructions that can be loaded into the hard disk 114. In an embodiment, the program instruction modules of the conversational system 105 having a deictic reference tool 107 for teaching deictic references and referent objects of deictic references to the conversational system for performing actions and/or tasks with respect to the referent objects known to or learned by the conversational system 105 are stored on the hard disk or other non-volatile memory, in whole or in part, while the whole or parts are not in use, and are copied into working memory when the program instructions are in use. Further, in an embodiment, the computer system 300 can download machine readable instructions stored on a server coupled to the vehicle computer system 300 via the network 194. Furthermore, the communications adapter 118 is configured to permit communication between the various components or modules of the computer system 300. In an embodiment, the tool or machine 302 utilizes one or more devices coupled to the user interface adapter 150, such as, a video camera 151 and/or a laser scanner device or subsystem 153 for learning deictic references and referent objects of deictic references to the conversational system for performing actions and/or tasks with respect to the referent objects known to or learned by the conversational system. Additionally, the user interface adapter 150 may be coupled to one or more devices, such as, a microphone 152, a joystick 154, an audio amplifier 156 and/or a touch screen 158. The user interface 150, in one embodiment, is configured to enable a user to interact with the computer system in the tool or machine 300 for teaching deictic references and referent objects of deictic references to the conversational system for performing actions and/or tasks with respect to the referent objects known to or learned by the conversational system, for instance, using the video camera 151 to observe the referent objects of the deictic references being taught to the conversational system using the deictic reference tool or program 107. For instance, to help in learning or understanding a deictic reference, the tool or machine 300 could use a prehensile manipulator for pointing or could use a tool operated through a conversational interface that is equipped with a low power visible laser scanner subsystem 153 that can draw or paint patterns and images, where an output subsystem would permit the conversation learning system to express its understanding of the extent of the referent object by using the laser scanner subsystem 153 to outline, draw and/or paint the object, utilizing the conversational system 105 to ask for confirmation. For example, a robotic surgeon, may indicate the line of a to-be-performed scalpel cut, using a laser to draw or paint or outline the deictic referent while asking for confirmation of its understanding. Alternatively, the robot's visual field can be displayed on a video screen or display with the assumed referent highlighted or outlined. The conversational system 105 learns the deictic reference by decoding the spoken voice command using the spoken language command and control system and the deictic reference tool 107 learns the deictic reference by associating the deictic reference with a referent object of the deictic reference, as discussed further herein below with respect to FIGS. 9-11.

Figure 4:
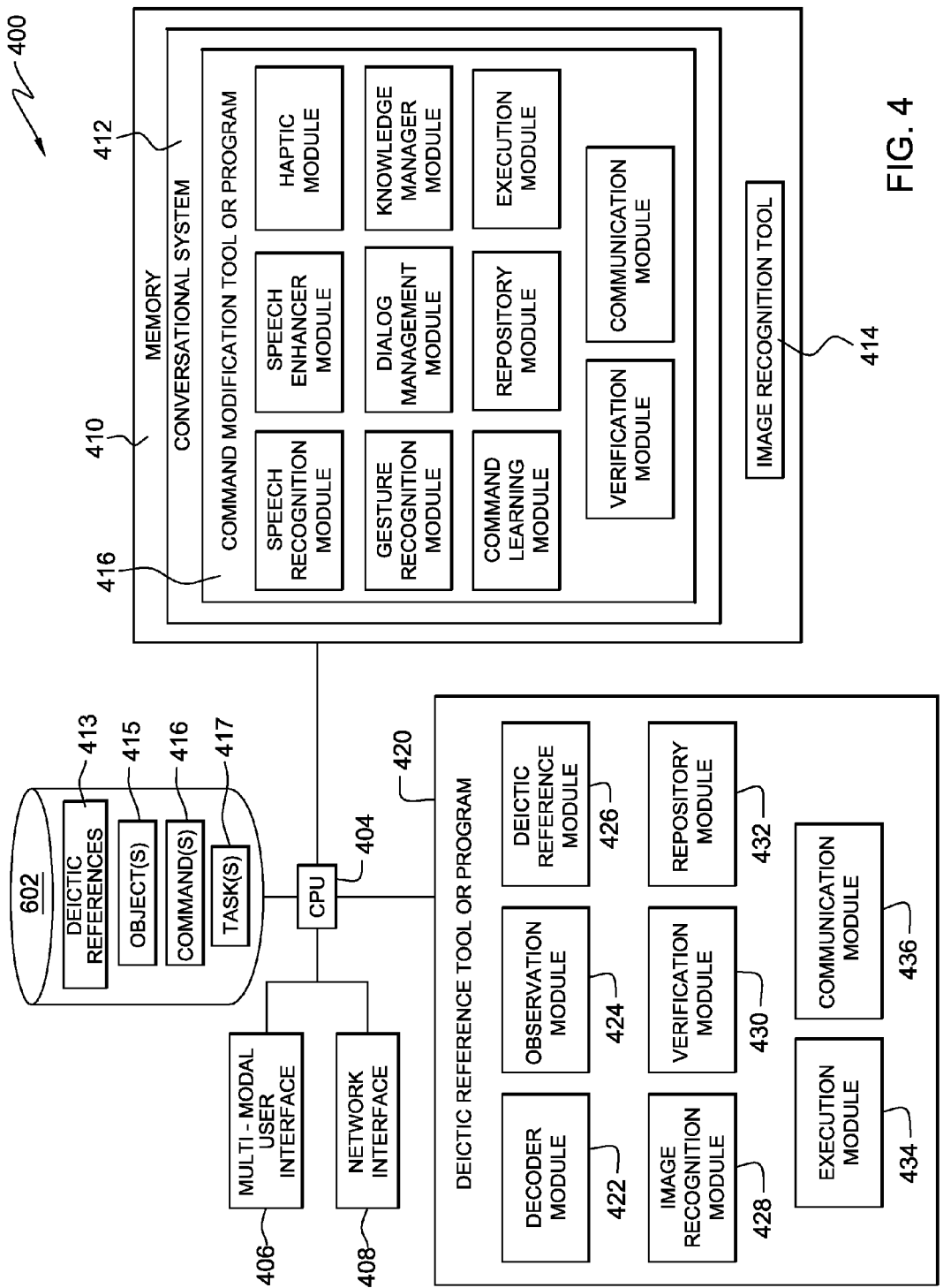
FIG. 4 depicts an embodiment of a computer system in a vehicle or a machine having deployed thereon a conversational command and control system having a deictic reference tool or program for user-guided teaching of deictic references and referent objects of deictic references to the conversational system for performing actions and/or tasks with respect to the referent objects known to or learned by the conversational system, in accordance with an embodiment of the present invention.

Reference is now made to FIG. 4, reference numeral 400, which depicts an embodiment of a computer system in a vehicle or machine that includes a computer program product, namely, a conversational system 412 having a deictic reference tool or program 420 for user-guided teaching of deictic references and referent objects of deictic references to the conversational system for performing actions and/or tasks with respect to the referent objects known to or learned by the conversational system, in accordance with an embodiment of the present invention. Further, in an embodiment, the conversational system 412 includes a command modification tool or program 416 for teaching and modifying voice commands and actions executed by the conversational system. In an embodiment, the conversational system 412 is installed within a local memory 410 of the computer system 400, for instance, a computer system used in a speech enabled car or in home automation or in a robot, as described herein above with respect to FIGS. 1-3. Preferably, the computer system 400 includes a central processing unit (CPU) 404, a local storage device 402, a multi-modal user interface 406, a network interface 408, and a memory 410. The CPU 404 is configured generally to execute operations within the computer system 400. The multi-modal user interface 406, in one embodiment, is configured to enable a user or operator to interact with the computer system 400, including allowing input of voice commands (via a device connected to the user interface adapter 150 of the vehicle data and control bus 180 or the home data and control bus 182, shown in FIGS. 1 and 2, respectively) and/or indicated data inputted (for instance, via a touch screen 158 or joystick 154 coupled to the user interface adapter 150, shown in FIGS. 1 and 2, respectively) for teaching deictic references and referent objects of deictic references to the conversational system for performing actions with respect to the referent objects known to or learned by the conversational system 400. The network interface 408 is configured, in one embodiment, to facilitate network communications of the computer system 400 over a communications channel of a network, such as the network 194, shown in FIGS. 1-3. In an embodiment, the memory 410 is configured to store one or more applications or programs, such as, the conversational system 412, which includes the deictic reference tool or program 420 and a command modification tool or program 416. In an embodiment, the command modification tool 416 includes a speech recognition module, a speech enhancer module, a haptic module, a gesture recognition module, a dialog management module, a knowledge manager module, a command learning module, a repository module, an execution module, a verification module and a communication module. In an embodiment, the speech recognition module is configured to recognize spoken language or utterances and to semantically interpret incoming user requests and utterances. In particular, the speech recognition module converts speech signals into a sequence of words. The speech enhancer module is configured to remove noises and acoustic signals. In an embodiment, the haptic module is configured to receive haptic input via devices connected to the data and control bus in the vehicle or home system. The gesture recognition module is configured to decode indications made via a respective physical user interface of the conversational system, such as, a touch screen. The dialog management module is configured to semantically interpret incoming user requests and utterances and to manage interactions between the user and the conversational system in order to modify a pre-determined voice command set and/or actions of the conversational system. Further, the knowledge manager module is configured to control access to knowledge systems. The command learning module is configured to learn a set of commands to be performed upon the utterance of a voice command or upon receiving an indication or input made via a physical user interface. The repository module is configured to store the voice commands and/or actions learned or modified in a local storage 402. The execution module is configured to execute performance of a set of commands, tasks and/or actions learned and/or modified upon the utterance of a voice command. The verification module is configured to record responses received from one or more respective systems in the vehicle or machine in order to detect any errors in future execution of the one or more action command sequences corresponding to the new voice command learned. The communication module is configured to permit communication between the various modules of the command modification tool, memory, local storage 402 and with external systems, as well as communication with the deictic reference tool or program 420. Further, in one embodiment, as shown in FIG. 4, the deictic reference tool or program 420 which runs on the computer system 400 comprises of a logic unit that contains a plurality of modules configured to functionally execute the necessary steps of user-guided teaching of deictic references and objects of deictic references to the conversational system 412, as explained further herein below. In an embodiment, shown in FIG. 4, the deictic reference tool or program 420 running on the vehicle or machine computer system 400 includes a decoder module 422, an observation module 424, a deictic reference module 426, an image recognition module 428, a verification module 430, a repository module 432, an execution module 434, and a communication module 438. In an embodiment, the decoder module 422 utilizes the conversational system 412 loaded in memory 410 to decode voice commands and/or utterances and to semantically interpret incoming user requests and utterances. The observation module 424 utilizes devices, such as, the video camera 151 to observe and decode physical acts of pointing in a deictic reference received from a user. The deictic reference module 426 associates referent objects of a deictic reference learned with the existing command vocabulary set of the conversational system to be able to distinguish referent objects for accomplishing tasks and/or actions with respect to referent objects taught to or learned by the conversational system, as requested by a user. The image recognition module 428 utilizes the image recognition tool 414 for recognizing referent objects in a deictic reference. In an embodiment, the image recognition tool 414 comprises recognition algorithms and recognition data. In an embodiment, the image recognition tool 414 processes raw data, such as, a collection of images of a particular object, into a form that can be used by the image recognition tool to determine whether or not a class of object is present in the system's visual field. The verification module 430 verifies understanding of the deictic references and the referent objects of the deictic references based on responses received from the user confirming or correcting understanding of the deictic references and the referent objects of the deictic references. The repository module 432 stores the referent objects 415 learned for the deictic references 413 in the local storage 402. Further, the repository module 432 stores voice commands 416 and/or actions and/or tasks 417 learned or modified by the conversational system 412 in the local storage 402. The execution module 434 is configured to execute performance of actions and/or tasks with respect to the referent objects of the deictic references learned by the conversational system 412. The communication module 436 is configured to permit communication between the various modules of the deictic reference tool 420, memory 410, local storage 402 and with external systems connected to the computer system 400.

Figure 5:
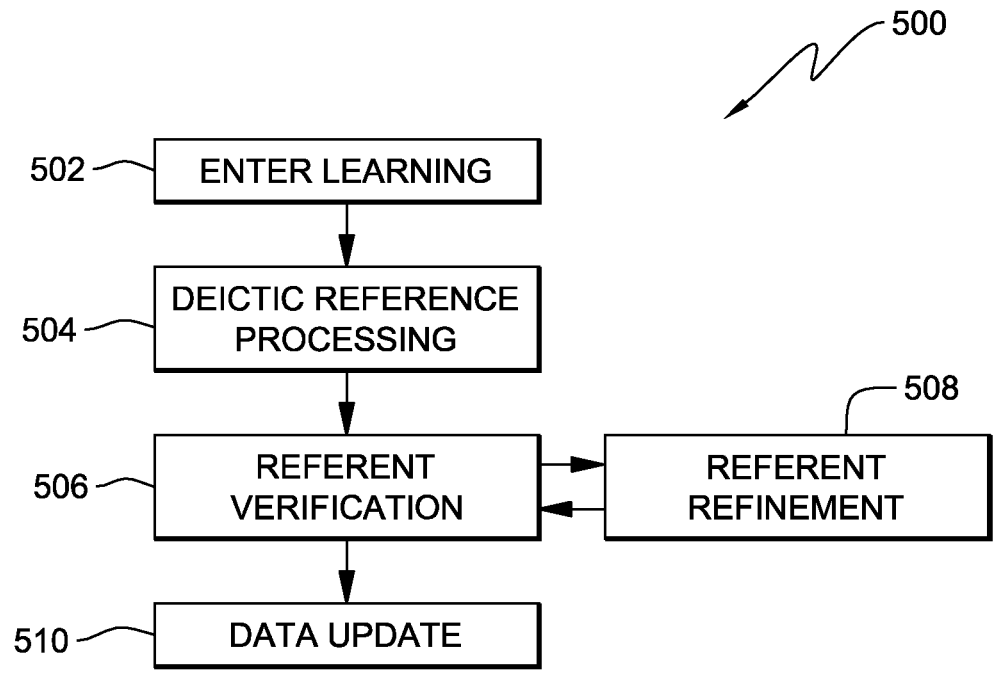
FIG. 5 depicts a flowchart outlining the overall steps performed by a deictic reference tool or program of a conversational command and control system installed in a vehicle or machine for user-guided teaching of deictic references and referent objects of deictic references to the conversational system for performing actions and/or tasks with respect to the referent objects known to or learned by the conversational system, in accordance with an embodiment of the present invention.
Figure 6:
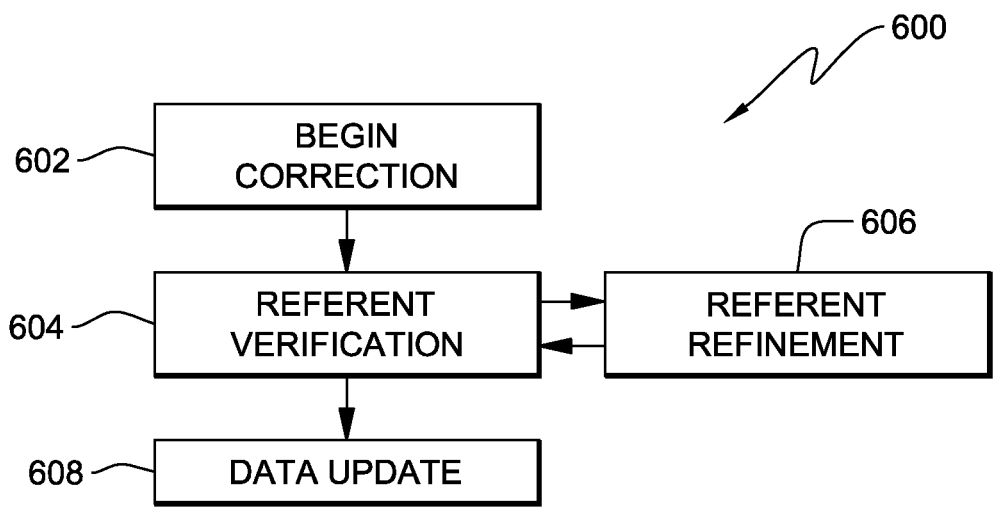
FIG. 6 depicts a flowchart outlining the overall steps performed by a deictic reference tool or program of a conversational command and control system installed in a vehicle or machine for user-guided correction of deictic references and referent objects of deictic references taught to the conversational system for performing actions and/or tasks with respect to the referent objects known to or learned by the conversational system, in accordance with an embodiment of the present invention.

In another embodiment, the invention provides a method or process for teaching deictic references and referent objects of deictic references to the conversational system for performing actions with respect to the referent objects known to or learned by the conversational system, in accordance with an embodiment of the present invention. Reference is now made to FIGS. 5 and 6, which together illustrate an embodiment of a method or process for teaching deictic references and referent objects of deictic references to the conversational system for performing actions with respect to the referent objects known to or learned by the conversational system. In particular, FIG. 5, reference numeral 500, outlines the overall learning process steps performed by a conversational system having a deictic reference tool installed thereon for teaching deictic references and referent objects of deictic references to the conversational system for performing actions and/or tasks with respect to the referent objects known to or learned by the conversational system, whereas, FIG. 6, reference numeral 600, outlines the overall steps performed by a conversational system for executing a deictic reference that has been learned upon receipt of the deictic reference from a user, in accordance with an embodiment of the present invention. Turning now to FIG. 5, FIG. 5 outlines the overall learning process steps performed by a conversational system having a deictic reference tool installed thereon for teaching deictic references and referent objects of deictic references to the conversational system for performing actions and/or tasks with respect to the referent objects known to or learned by the conversational system. As shown in FIG. 5, in step 502, upon being prompted by a user (explained further herein below with respect to FIGS. 7 and 8 and discussed herein below with examples shown in FIGS. 9-11), the deictic reference tool provided in the conversational system begins or starts in step 502 the learning process for learning deictic references and referent objects of deictic references for performing actions and/or tasks with respect to the referent objects known to or learned by the conversational system. In an embodiment, in step 504, the conversational system processes the deictic reference received for learning the referent objects of the deictic reference. Further, in step 506, the conversational system verifies that the referent objects of the deictic reference is properly understood by the conversational system. If needed, the conversational system refines in step 508 the learning of the referent objects of the deictic reference learned. Finally, the conversational system updates data in step 510 pertaining to a deictic reference learned to be able to perform actions and/or tasks with respect to the referent objects of deictic references learned by the conversational system. In an embodiment, the present invention provides a process for deploying computing infrastructure, wherein the process comprises integrating computer-readable code into a computer system of a machine, and wherein the code in combination with the computer system is configured to perform a method for teaching an object of a deictic reference to a machine having a conversational system.

Further, referring to FIG. 6, reference numeral 600, depicts a flowchart outlining the overall steps performed by a conversational system having a deictic reference tool for correcting perception of a referent object of a deictic reference, in accordance with an embodiment of the present invention. As shown in FIG. 6, in step 602, the conversational system starts correction of a referent object of a deictic reference uttered by a user. In step 604, the conversational system verifies that the referent objects of the deictic reference is properly understood by the conversational system. As needed, the conversational system refines in step 606 the learning of the referent objects of the deictic reference learned. Finally, the conversational system updates data in step 608 pertaining to a deictic reference learned to be able to perform actions and/or tasks with respect to the referent objects of deictic references learned by the conversational system.

Figure 7:
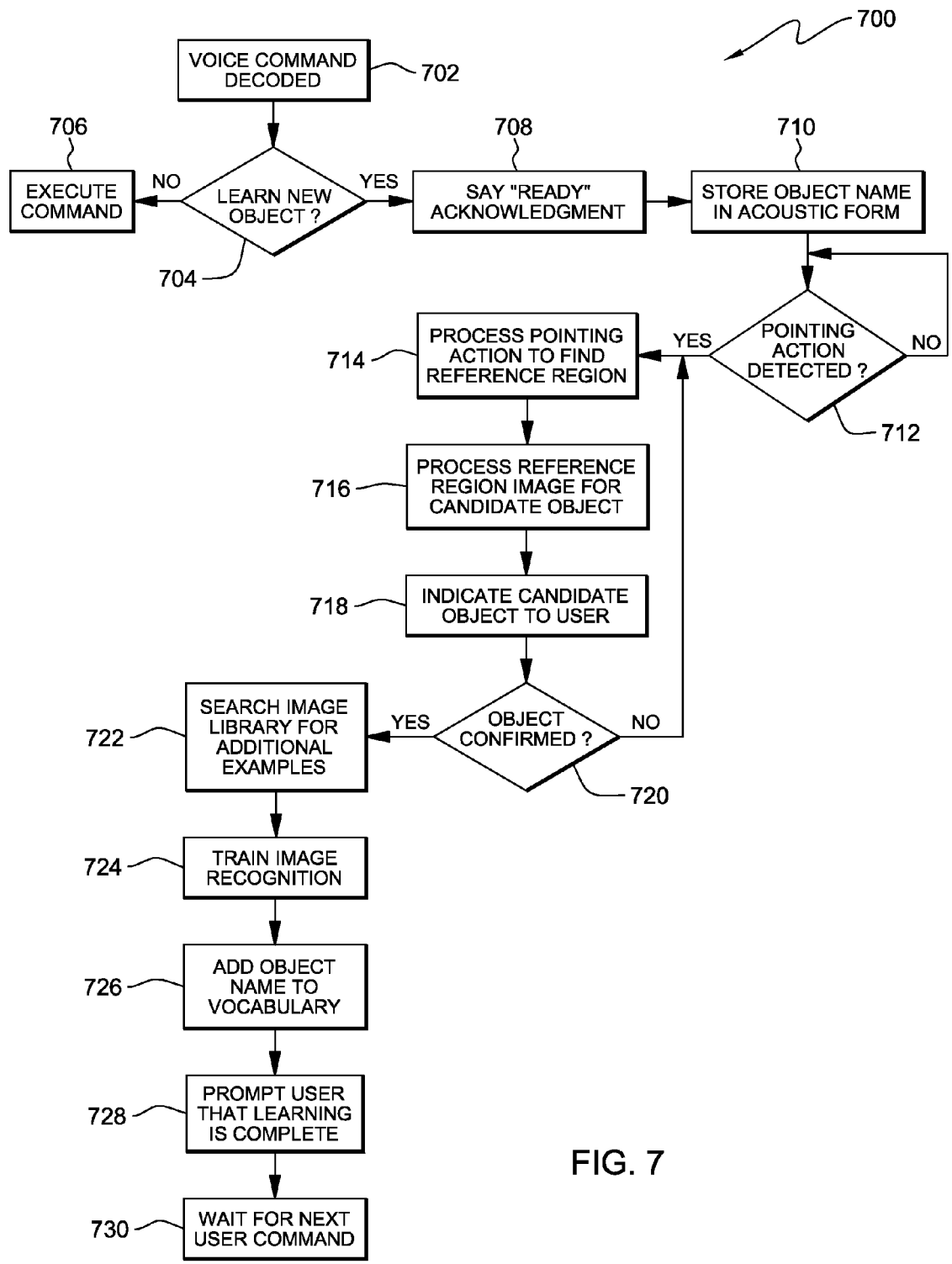
FIG. 7 depicts a flowchart outlining the detailed steps performed by a deictic reference tool or program of a conversational command and control system in a machine or vehicle for user-guided teaching of a referent object of a deictic reference received from a user, in accordance with an embodiment of the present invention.

Reference is now made to FIG. 7, reference numeral 700, which outlines the steps performed by the deictic reference tool in the conversational system for teaching deictic references and referent objects of deictic references to the conversational system for performing actions and/or tasks with respect to the referent objects known to or learned by the conversational system, in accordance with an embodiment of the present invention. In step 702, the conversational system having a deictic reference tool decodes the voice command issued or an utterance that is spoken by a user about to teach the conversational system a deictic reference input, as described in an example further herein below with respect to FIG. 9. Further, in step 704, a determination is made by the deictic reference tool in the conversational system as to whether or not the voice command decoded is to learn a command for a new object of a deictic reference or to execute a command with respect to an object of a deictic reference already learned. If the conversational system determines in step 704 that the voice command decoded is to execute a command that exists within the set of voice commands for acting on an object already learned by the conversational system, then the conversational system executes the command in step 706, which is discussed herein below with respect to FIG. 8. However, if the conversational system determines that the voice command decoded is to learn a new object, then the conversational system acknowledges that it is ready by saying "Ready" or some other similar acknowledgement. In step 710, the conversational system stores the object name in acoustic form and further determines in step 712 whether or not a pointing action is detected in the deictic reference received from a user. If a pointing action is not detected then the conversational system waits until a pointing action is detected in step 712. However, if a pointing action is detected in step 712, then in step 714, the deictic reference tool processes the pointing action to find a reference region. The deictic reference tool processes the reference region image in step 716 to located a candidate object of the deictic reference. In step 718, the deictic reference tool indicates the candidate object to the user for confirmation. The deictic reference tool determines whether or not the object has been confirmed by the user. If the object is not confirmed by the user, then the deictic reference tool returns to step 714 to process the pointing action to find the reference region of the pointing action. However, if in step 720, the object is confirmed by the user, then the deictic reference tool optionally searches in step 722 an image library stored on the computer system for additional examples of the object. Further, in step 724, the deictic reference tool utilizes the original and any additional images to train image recognition of the object. The deictic reference tool adds in step 726 the object name to a vocabulary set in the conversational system. In step 728, the deictic reference prompts the user that the learning process is complete and waits, in step 730 for the next user command.

Figure 8:
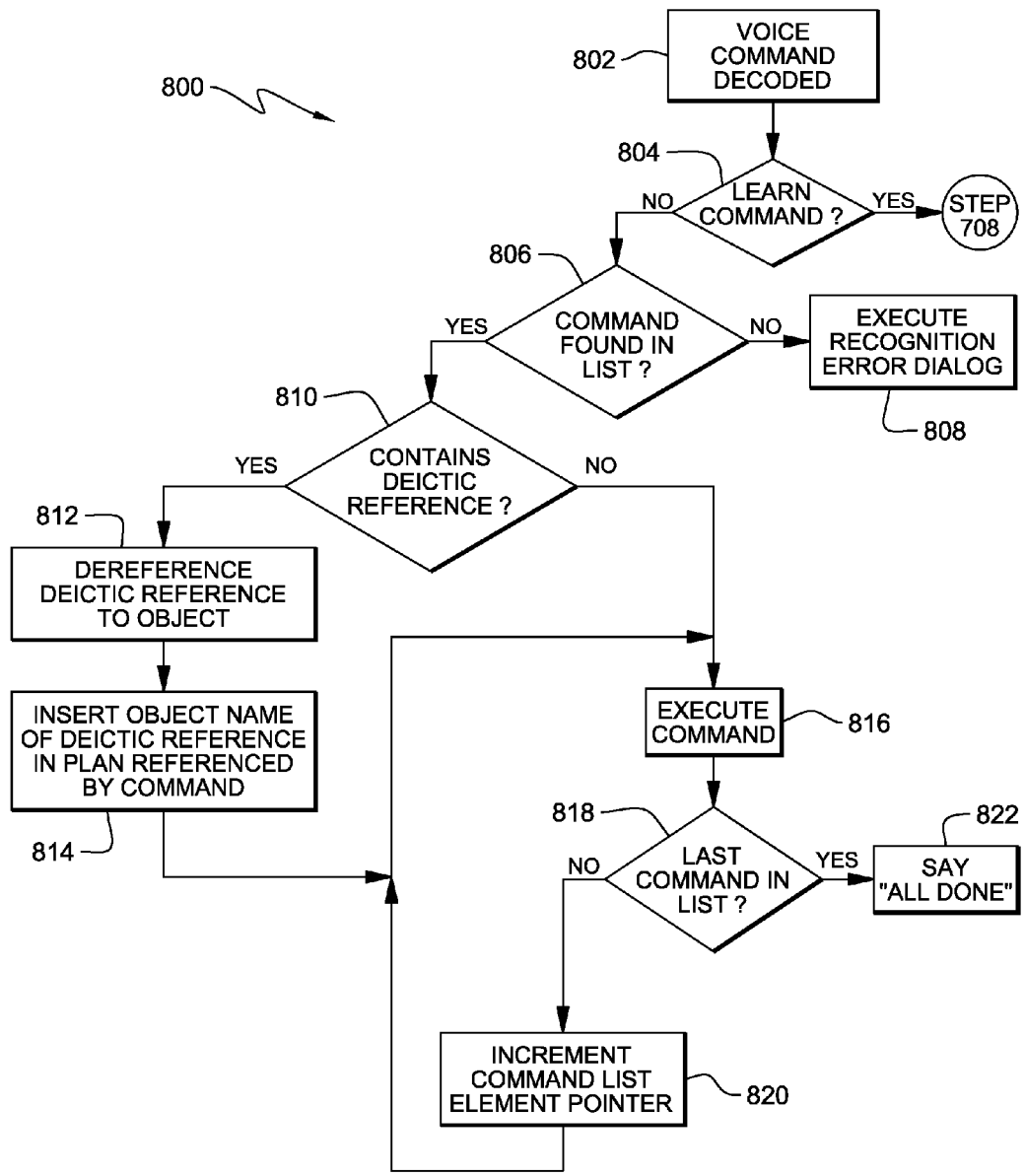
FIG. 8 depicts a flowchart outlining the detailed steps performed by a deictic reference tool or program of a conversational system in a machine or vehicle for executing actions and/or tasks on a referent object of a deictic reference learned, in accordance with an embodiment of the present invention.

Reference is now made to FIG. 8, reference numeral 800, which depicts a flowchart outlining the detailed steps performed by a conversational system having a deictic reference tool for performing or executing the command or action sequences associated with a learned deictic reference upon receiving a deictic reference, in accordance with an embodiment of the present invention. In step 802, the deictic reference tool decodes the voice command received from a user. The deictic reference tool makes a determination in step 804 whether or not the voice command is to learn a new command. If the deictic reference tool determines that the voice command is to learn a new command, then the deictic reference tool begins the learning process at step 708, as described in FIG. 7. However, if the deictic reference tool determines in step 804 that the voice command is not to learn a command, then in step 806, the deictic reference tool determines whether or not the voice command uttered for the deictic reference is found in the list of commands maintained by the conversational system. If the conversational system determines that the voice command uttered is not found in the list, then the conversational system executes in step 808 a recognition error dialog, where the user is notified of the error, in particular, of the error of not finding or recognizing the command in the existing list of commands, ending the process of executing the voice command uttered for the deictic reference. However, if the voice command uttered is found in the list, then the deictic reference tool in the conversational system determines in step 810 whether or not the voice command contains a deictic reference. Further, in step 812, the deictic reference tool dereferences the deictic reference to an object of the deictic reference. Furthermore, the conversational system constructs a plan by referencing the command list (based on the command uttered) and substitutes the specified object in step 814 into the plan in appropriate places. A planning module is then used to expand the command into a command list, which takes the specifics of the command and the circumstances into account. Such planning systems are well known within the robotics and autonomous vehicle communities and are outside the scope of this invention. The completed plan for the step containing the deictic reference is then executed in step 816. In step 818, the deictic reference tool determines whether or not the command executed is the last command in the list and, if so, the deictic reference tool in the conversational leaning system says "all done" in step 822. However, if in step 818, the deictic reference tool determines that the last command executed is not the last command in the list, then the message for the voice command is not sent, then the deictic reference tool in the conversational system increments in step 820 the command list element pointer to execute the next command in the list in step 816. Again, after the deictic reference tool determines that the last command has been executed in the list in step 818, the deictic reference tool in the conversational leaning system says "all done" in step 822.

Reference is now made to FIGS. 9, 10 and 11, reference numerals 900, 1000 and 1100, respectively, which depict examples of various dialogs between a user and a machine, such as, a robot. Turning to FIG. 9, FIG. 9 shows an example of a training dialog that occurs between a user and a machine, such as, a robot having a computer system with a conversational system that includes a deictic reference tool or program for performing user-guided teaching of deictic references and referent objects of deictic references to the conversational system for performing actions with respect to the referent objects known to or learned by the conversational system. The training dialog 900 begins with the user (reference numeral 902) speaking to the robot named Tobor, saying "Tobor, learn a new object." The robot, Tobor, responds (reference numeral 904), "I'm ready to learn a new object." The user (reference numeral 906) points in the direction of an apple on a nearby table and speaks or utters the words "That is an Apple." Tobor responds (reference numeral 908) "Let me see if I've got this straight", where Tobor uses an image recognition software installed on Tobor's computer system to analyze the pointing gesture in order to determine the region indicated by the pointing act. In an embodiment, the computer system, engaged in deictic reference learning or decoding a command containing deictic reference searches its video field of view for a hand in a pointing posture (similar to a manner in which such systems find faces in video images) by detecting appropriate features. The video image processing may then take any object intersecting the plane defined by the camera location, the pointing finger tip and the average location of the wrist as a possible target of the pointing gesture provided they lay in the finger tip side of the plane. Such a video processing system is well understood in the field of autonomous vehicle path planning and is outside the scope of this invention. Returning to the example in FIG. 9, finding a table in the region of where the user is pointing, and not having a "table" reference in its vocabulary, Tobor uses a laser scanner to illuminate or outline the tabletop beginning a confirming deictic reference, "that is an Apple." The user responds (reference numeral 910) with a "No". Tobor, in return asks (reference numeral 912), "How about this? by illuminating a table leg. The user replies (reference numeral 914) with "Colder", whereby Tobor illuminates the bowl of fruit on the table and asks (reference numeral 916) "How about this?" The user replies (reference numeral 918) "Warmer". Tobor further illuminates an apple visible over the top of the bowl (reference numeral 920) and asks "Is this it?" to which the user replies "Yes" (reference numeral 922). To further understand the meaning of "Apple", Tobor may (reference numeral 924) move to the table and pick up the apple to develop a larger database of apple images and may additionally measure the weight and surface friction that an apple presents. Furthermore, Tobor may use a network connection and/or a stored image database to collect additional images of apples in order to obtain more training data and the spelling of the word "apple". Following image processing and storage of the new vocabulary word, Tobor completes the dialog by stating (reference numeral 926) "I think I understand the word 'apple'."

Turning to FIG. 10, FIG. 10 represents a command and control dialog on a subsequent occasion with Tobor, where the user uses deictic reference. It is assumed here that Tobor's command vocabulary includes the phrase "Bring x to me", where "x" is an object in Tobor's vocabulary. As such, the user says to Tobor (reference numeral 1002) "Open the refrigerator." Tobor replies (reference numeral 1004) with "OK" and locates and opens the refrigerator. The user further speaks (reference numeral 1006) by pointing at the interior of the refrigerator, "Bring me that apple." Tobor uses (reference numeral 1008) image processing to distinguish an apple in the referenced region, and picks up the apple and executes the "Bring x to me" command and speaks "Here you are." The user replies (reference numeral 1010) "Thanks".

Turning to FIG. 11, FIG. 11 depicts a correction dialog on a subsequent occasion, where the user has a command and control dialog with Tobor and depicts a dialog in which Tobor is incorrect in its understanding of a deictic reference. In the example of FIG. 11, the user has arrived in the produce department of a supermarket with Tobor and the user points to a produce stand with apples, oranges and grapes and speaks (reference numeral 1102) "Bring me three of those apples." Tobor (reference numeral 1104) applies its recognition software and is unable to distinguish the red apples from the oranges and brings three oranges from the produce stand. The user responds (reference numeral 1106) with "Wrong" As such, Tobor would go back to using the image recognition software to analyze the pointing gesture in order to determine the region indicated by the pointing act and would carry on a dialog with a user until Tobor correctly brings three apples from the produce stand to the user.

Furthermore, the user-guided teaching of deictic references to the conversational system can be combined with haptic commands sent using a haptic interface of the vehicle or machine. The user may combine two modalities (verbal and haptic) in a single utterance for teaching the equivalence between utterances and actions to a conversational system. For example, uttering the phrase 'I want to go there' means that the user wishes to receive driving directions to a location that is indicated (not spoken) via a second modality (in this case, a touch-screen). Training the conversational system may include the user saying to the system "Learn something new" and the system may respond saying "what's it called"? The user says "I want to go there" and the system responds "Show me what to do". The user turns to the navigation system and says "Navigation", which responds by saying "Ready". The user pushes 'plot route' screen button on the navigation system (haptic) and the navigation system asks "Where to?" The user speaks "Gather parameters" (a command to the learning module to expect data for each script execution). Further, the user points to a location (by touching a map) and the navigation system captures point coordinate message. The user speaks "Calculate route" and finishes by saying "Teaching complete. Executing the script for this example may proceed by the user speaking the phrase "I want to go there" and the system creates an asynchronous software process, such as, a Java "Listener" for the point coordinate message from the navigation system. Further, the system creates an asynchronous software process, such as, a Java "Listener" for the "Ready" message from the navigation system and also creates an asynchronous software process, such as, a Java "Listener" for the "where to?" message from the navigation system and sends the navigation command to start execution. The navigation system returns "ready", where the "ready" listener triggers next phase of the script. The system sends plot route command to the navigation system and the navigation system returns "where to?" Further, the "where to?" listener triggers the next phase of the script and the user touches location on a map in the navigation system and the navigation system returns the touched map coordinates. The system inserts coordinates in command and sends "navigate route" to the map coordinates. It will be obvious to one of ordinary skill in the art that some learned commands cannot be described without including a step which gathers input from the user at each specific execution instance. The invention as described includes the capability for incorporating commands or sequences of commands given through the spoken language command and control system. Case specific user input requirements can be accommodated by including a spoken command such as "gather parameters" or "get user input" in the command set of the spoken language command and control system.

Accordingly, the invention provides a machine, system and method for teaching deictic references and referent objects of deictic references to a spoken or conversational command and control system in a tools or machines, such as, cars and unspecialized tools, such as, robots, where the expertise can be built into the tool or machine itself by adding a user-guided deictic reference learning mode to such tools or machines to simplify their operation and greatly increase their utility. Accordingly, the invention provides means by which objects of a deictic reference can be taught to a conversational command and control system having a deictic reference tool that can be engaged or evoked by the user to increase the set of objects that can be distinguished by a computer system, where the deictic reference tool can verify its understanding of a deictic reference, and can correct any errors in its understanding of a deictic reference. Further, the distinguishable objects learned may be associated with a spoken name, where the name is used in the vocabulary of the conversational or spoken language command and control system to accomplish tasks that were not anticipated by the command and control system designer. As a deictic reference and the referent objects of the deictic reference are taught to a computing system, the computing system may be informed of errors in its discernment of the referent by the human teacher or by means built into its own software for measuring the certainty of identification of the referent. In such cases, the computing system may be equipped to perform its own act of deictic reference. It will be obvious to one of ordinary skill in the art that a system for user-guided teaching of deictic referents may be combined with a spoken language command and control system whether or not that system includes user guided teaching of command vocabulary and sequence. The taught deictic reference tool provides the means by which the objects to be acted upon may be specified while the command and control system provides the means by which the actions to be carried out on that object may be specified. Further, technology for object recognition may rely on any of several means well known to those skilled in the art, which include, but are not limited to, neural networks and hidden Markov models, which are recognition technologies composed of recognition algorithms and recognition data. It is commonly the case that some auxiliary software tool is used to process raw data, such as, processing a collection of images of a particular object into a form that can be used by the recognition algorithm to determine whether or not that class of object is present in the system's visual field. Further, a personal assistant robot equipped with a spoken language command and control system and the deictic reference system described herein may be taught to retrieve an object as an assistive act for a handicapped user. The set of objects that the user may need to deal with through the robot's mediation are likely to differ from the objects which other users deal with and, therefore, the robot will need to use the deictic reference system to be maximally useful.

The foregoing descriptions of specific embodiments of the present invention have been presented for the purpose of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for teaching an object of a deictic reference to a machine having a conversational system, said method comprising:
   a processor of the machine teaching the object of the deictic reference to the machine which results in the machine learning the object, said machine selected from the group consisting of an automobile and a robot, said teaching comprising:
      said processor receiving, from a user, a voice command that declares a name of the object and analyzing a physical pointing gesture, by the user, that points to the object;
      in response to said analyzing the physical pointing gesture, said processor finding an item in a region indicated by the pointing gesture and determining that a reference describing the item is not in a dictionary of the machine;
      in response to said determining that a reference describing the item is not in the dictionary of the machine, said processor shining a laser light on the item and in response, said processor receiving a negative spoken indication from the user that the item shined on by the laser light is not the object;
      in response to the negative spoken indication from the user, said processor interacting with the user in an iterative procedure, wherein during each iteration of the procedure, said processor shining the laser light on a portion of the item or on something thing that is physically coupled to the item and in response, said processor receiving from the user (i) a first spoken indication that the laser light has shined closer to the object than in the previous iteration, (ii) a second spoken indication that the laser light has shined further from the object than in the previous iteration, or (iii) a third spoken indication that the laser light has shined on the object, wherein the machine learns the object in a final iteration of the procedure in which the processor receives the third spoken indication from the user;
   said processor storing the learned object and the voice command in a storage repository; and
   said processor executing a task with respect to the learned object.

2. The method of claim 1, wherein the machine is the automobile.

3. The method of claim 1, wherein the machine is the robot.

4. The method of claim 1, said method further comprising:
   after the machine has learned the object, said machine moving to the item and picking up the object to develop: a larger database of the object, a measure of a weight of the object, and surface friction presented by the object.

5. The method of claim 1, said method further comprising:
   after the machine has learned the object, said machine speaking words communicating that the machine understands the name of the object.

6. A process for deploying computing infrastructure, said process comprising integrating computer-readable code into a machine, said machine selected from the group consisting of an automobile and a robot, wherein the code in combination with the machine is configured to perform a method for teaching an object of a deictic reference to the machine, said machine having a conversational system, said method comprising:
   a processor teaching the object of the deictic reference to the machine which results in the machine learning the object, said machine comprising the processor, said teaching comprising:
      said processor receiving, from a user, a voice command that declares a name of the object and analyzing a physical pointing gesture, by the user, that points to the object;
      in response to said analyzing the physical pointing gesture, said processor finding an item in a region indicated by the pointing gesture and determining that a reference describing the item is not in a dictionary of the machine;
      in response to said determining that a reference describing the item is not in the dictionary of the machine, said processor shining a laser light on the item and in response, said processor receiving a negative spoken indication from the user that the item shined on by the laser light is not the object;
      in response to the negative spoken indication from the user, said processor interacting with the user in an iterative procedure, wherein during each iteration of the procedure, said processor shining the laser light on a portion of the item or on something thing that is physically coupled to the item and in response, said processor receiving from the user (i) a first spoken indication that the laser light has shined closer to the object than in the previous iteration, (ii) a second spoken indication that the laser light has shined further from the object than in the previous iteration, or (iii) a third spoken indication that the laser light has shined on the object, wherein the machine learns the object in a final iteration of the procedure in which the processor receives the third spoken indication from the user;
   said processor storing the learned object and the voice command in a storage repository; and
   said processor executing a task with respect to the learned object.

7. The process of claim 6, wherein the machine is the automobile.

8. The process of claim 6, wherein the machine is the robot.

9. The process of claim 6, said method further comprising:
   after the machine has learned the object, said processor directing the machine to move to the item and pick up the object to develop: a larger database of the object, a measure of a weight of the object, and surface friction presented by the object.

10. The process of claim 6, said method further comprising:
   after the machine has learned the object, said processor directing the machine to speak words communicating that the machine understands the name of the object.

11. A computer program product, comprising a computer readable storage device having computer readable code stored therein, said code containing instructions configured to be executed by a processor to implement a method for teaching an object of a deictic reference to a machine, said machine having a conversational system, said machine comprising the processor and the storage device, said machine selected from the group consisting of an automobile and a robot, said method comprising:

said processor teaching the object of the deictic reference to the machine which results in the machine learning the object, said teaching comprising:

said processor receiving, from a user, a voice command that declares a name of the object and analyzing a physical pointing gesture, by the user, that points to the object;

in response to said analyzing the physical pointing gesture, said processor finding an item in a region indicated by the pointing gesture and determining that a reference describing the item is not in a dictionary of the machine;

in response to said determining that a reference describing the item is not in the dictionary of the machine, said processor shining a laser light on the item and in response, said processor receiving a negative spoken indication from the user that the item shined on by the laser light is not the object;

in response to the negative spoken indication from the user, said processor interacting with the user in an iterative procedure, wherein during each iteration of the procedure, said processor shining the laser light on a portion of the item or on something thing that is physically coupled to the item and in response, said processor receiving from the user (i) a first spoken indication that the laser light has shined closer to the object than in the previous iteration, (ii) a second spoken indication that the laser light has shined further from the object than in the previous iteration, or (iii) a third spoken indication that the laser light has shined on the object, wherein the machine learns the object in a final iteration of the procedure in which the processor receives the third spoken indication from the user;

said processor storing the learned object and the voice command in a storage repository, and said processor executing a task with respect to the learned object.

12. The computer program product of claim 11, wherein the machine is the automobile.

13. The computer program product of claim 11, wherein the machine is the robot.

14. The computer program product of claim 11, said method further comprising:

after the machine has learned the object, said processor directing the machine to move to the item and pick up the object to develop: a larger database of the object, a measure of a weight of the object, and surface friction presented by the object.

15. The computer program product of claim 11, said method further comprising:

after the machine has learned the object, said processor directing the machine to speak words communicating that the machine understands the name of the object.

16. A system comprising: a machine selected from the group consisting of an automobile and a robot, said machine comprising a processor, a memory coupled to the processor, and computer readable program code configured to be executed by the processor via the memory to implement a method for teaching an object of a deictic reference to the machine, said machine having a conversational system, said method comprising:

said processor teaching the object of the deictic reference to the machine which results in the machine learning the object, said teaching comprising:

said processor receiving, from a user, a voice command that declares a name of the object and analyzing a physical pointing gesture, by the user, that points to the object;

in response to said analyzing the physical pointing gesture, said processor finding an item in a region indicated by the pointing gesture and determining that a reference describing the item is not in a dictionary of the machine;

in response to said determining that a reference describing the item is not in the dictionary of the machine, said processor shining a laser light on the item and in response, said processor receiving a negative spoken indication from the user that the item shined on by the laser light is not the object;

in response to the negative spoken indication from the user, said processor interacting with the user in an iterative procedure, wherein during each iteration of the procedure, said processor shining the laser light on a portion of the item or on something thing that is physically coupled to the item and in response, said processor receiving from the user (i) a first spoken indication that the laser light has shined closer to the object than in the previous iteration, (ii) a second spoken indication that the laser light has shined further from the object than in the previous iteration, or (iii) a third spoken indication that the laser light has shined on the object, wherein the machine learns the object in a final iteration of the procedure in which the processor receives the third spoken indication from the user;

said processor storing the learned object and the voice command in a storage repository, and said processor executing a task with respect to the learned object.

17. The system of claim 16, wherein the machine is the automobile.

18. The system of claim 16, wherein the machine is the robot.

19. The system of claim 16, said method further comprising:

after the machine has learned the object, said processor directing the machine to move to the item and pick up the object to develop: a larger database of the object, a measure of a weight of the object, and surface friction presented by the object.

20. The system of claim 16, said method further comprising:

after the machine has learned the object, said processor directing the machine to speak words communicating that the machine understands the name of the object.

* * * * *